Oct. 20, 1970     S. S. ORKIN ET AL     3,535,006
BEARING CONSTRUCTION
Original Filed Sept. 29, 1966

INVENTORS
VINCENT J. HUDACKO
STANLEY S. ORKIN

BY
McCormick, Paulding & Huber
ATTORNEYS

United States Patent Office 3,535,006
Patented Oct. 20, 1970

3,535,006
BEARING CONSTRUCTION
Stanley S. Orkin, Rockville, Conn., and Vincent J. Hudacko, Copley, Ohio, assignors, by mesne assignments, to Kaman Aerospace Corporation, Bloomfield, Conn., a corporation of Delaware
Continuation of application Ser. No. 582,894, Sept. 29, 1966. This application Jan. 29, 1969, Ser. No. 808,360
Int. Cl. F16c 33/12
U.S. Cl. 308—72                                    15 Claims

ABSTRACT OF THE DISCLOSURE

A bearing comprising two engaging members movable relative to one another, the first of said members being made at least in part of carbonaceous material and the second of said members being made from a substrate of metal selected from the group consisting of titanium and titanium base alloys and a ceramic coating on said substrate made predominantly of material selected from the group consisting of aluminum oxide, chromium oxide, titanium dioxide, tungsten carbide and titanium carbide.

---

This is a continuation of application Ser. No. 582,894, filed Sept. 29, 1966 and now abandoned.

This invention relates to bearings, and deals more particularly with an improved plain bearing construction.

The bearing of this invention is in some respects similar to the bearing shown in the copending application of Stanley S. Orkin and Vincent J. Hudacko, Ser. No. 542,417, filed Apr. 13, 1966 and entitled Self-Lubricating Bearing. In the bearing shown in said application the two coengaging members which are movable relative to one another consist of a first member made at least in part of a carbonaceous material and a second member consisting essentially of a massive piece of ceramic material, preferably polycrystalline aluminum oxide. In the bearing construction of this invention said second member of the bearing is replaced by a member comprising a metal substrate, preferably of titanium or a titanium base alloy, coated with a ceramic material, to produce a bearing capable of handling higher static and dynamic loads while nevertheless retaining all of the other desirable properties of the bearing described in the preceding application.

The general object of this invention is therefore to provide a plain bearing capable of operating without lubrication at a low wear rate and therefor having a prolonged service life.

A further object of this invention is to provide a bearing construction of the foregoing character capable of operating satisfactorily over a wide temperature range and particularly up to a temperature as high as 800° F.

Other objects of the invention are to provide a bearing of the foregoing character which may be made in a variety of different shapes and forms, having a low static radial load displacement, a low starting torque, corrosion resistance, and requiring no initial wear-in phase.

A still further object of this invention is to provide a plain bearing, particularly a spherical bearing, including a ceramic bearing surface on one of the bearing members and eliminating the need for bushings, liners or other similar devices for protecting the ceramic material against damage.

Other objects and advantages of the invention will be apparent from the following description and from the drawing forming a part hereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
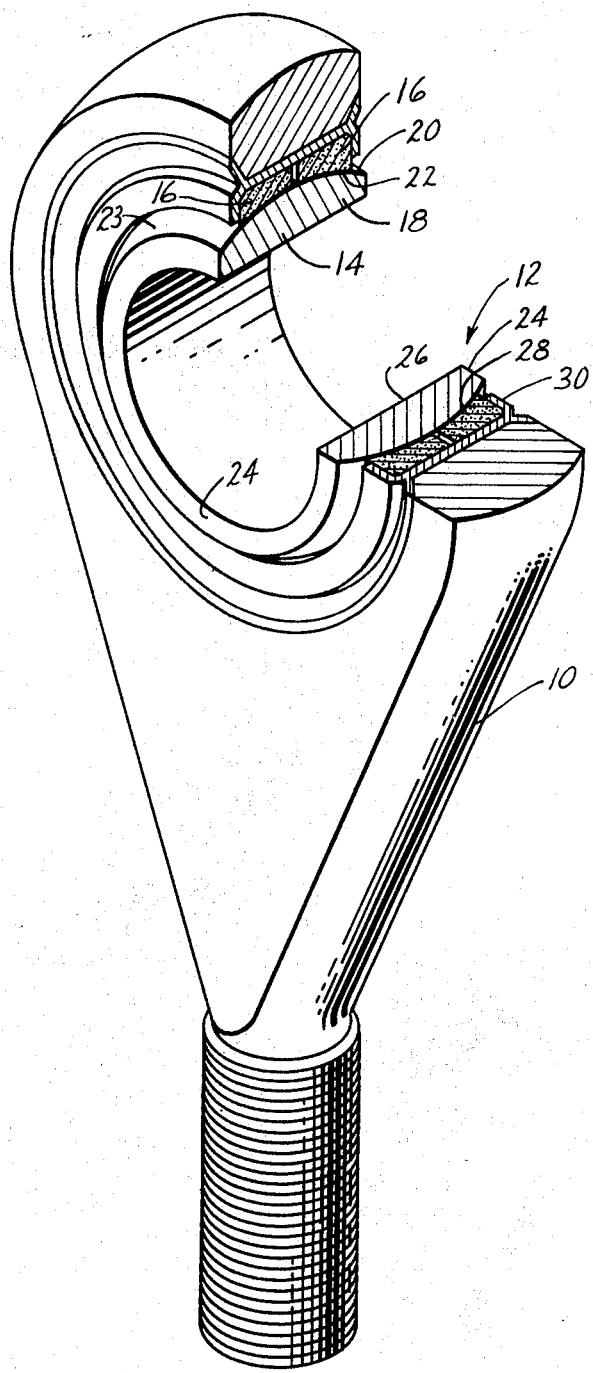
FIG. 1 is a perspective view of a rod end containing a bearing embodying the present invention, parts of the rod end and bearing being broken away to reveal more clearly the structure of the bearing.
Figure 2:
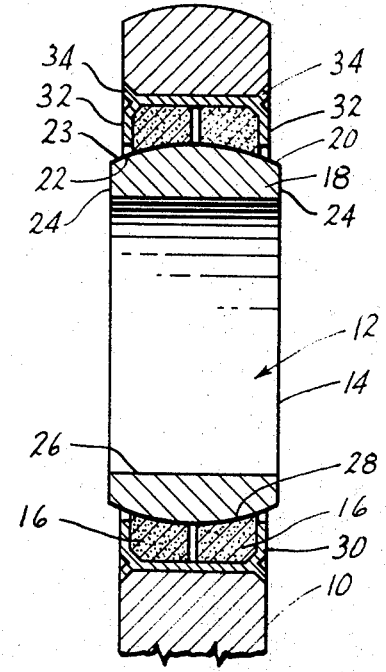
FIG. 2 is a vertical sectional view taken through the rod end of FIG. 1.

The bearing of this invention is of the type commonly referred to as a plain bearing, it comprising two bearing members having coengaging surfaces which slide rather than roll relative to one another. In the bearing of this invention the two coengaging surfaces are made respectively from a ceramic material and another material made up largely of carbonaceous material. The carbonaceous surface is preferably provided by a massive body of such material and may, for example, comprise a body made solely of a compacted mixture of carbon and graphite or may comprise a body made of a compacted mixture of carbon and graphite impregnated with a metal or other material, preferably silver. The ceramic surface is in turn provided by a thin coating of ceramic material deposited or otherwise applied to a high tensile strength metal substrate preferably made of titanium or a titanium base alloy. The combination of the ceramic and carbonaceous surfaces results in a dry bearing utilizing the inherent lubricity of the carbonaceous material and requiring no additional lubricant. The high wear resistance of the ceramic material reduces wear of the bearing parts and enables the parts to retain their initial shapes and dimensions over a long service lift. The use of the thin ceramic coating on the metal substrate further reduces problems of fracturing, chipping or otherwise breaking or damaging the ceramic material due to its relatively low tensile strength, the high strength substrate serving to carry the major portion of the tensile loads. That is, the high strength property of the substrate material is married to the low wear property of the ceramic material to produce a bearing having both low wear and high load carrying capability.

To produce this result it has been found that the ceramic coating must be sufficiently thin to permit slight deformation thereof, as a result of deformation of the substrate under load, without its fracturing, to achieve a transferral of the surface stresses, which will otherwise build up in the coating, to the substrate. Furthermore, the substrate must be within a particular hardness range. If it is too soft it will not provide proper support or backing for the coating and under load the substrate will deform to too large an extent and cause fracture of the coating. If it is too hard it will not provide a proper cushioning effect, surface stresses will not be transferred to the substrate, and the coating will fracture or otherwise fail as a result of such stresses. In particular, it is found that the substrate, when made of titanium or a titanium base alloy, should have a hardness within the range of 30 Rc to 40 Rc to obtain an optimum tradeoff between the tendency of the coating to fracture as a result of deformation and the tendency of the coating to fracture as a result of surface stresses. Also, the coating must have a thickness of less than 0.010 of an inch, a thickness of 0.005 to 0.001 of an inch being presently preferred.

It has been found that the use of titanium or a titanium base alloy as the substrate material is also desirable insofar as this metal provides a good bond with the ceramic coating. In addition, this substrate material is more chemically inert than most other materials which might be used and thereby eliminates or reduces any possibility of corrosion as might occur with other materials. This substrate material is also lighter in weight than most other materials which might be used and therefore offers the possibility of a weight reduction. It also has the property of retaining its strength while subjected to relatively high temperatures, up to approximately 800° F., and therefore permits the construction of a bearing capable of operating at such elevated temperatures. Also, and perhaps most important, it has a coefficient of thermal expansion substantially equal to that of the various coating materials which may be used for the ceramic coating and therefore little or no stresses are built up in the coating as a result of differential expansion of the substrate and the coating when operating over a wide temperature range.

The material of the ceramic coating used on the substrate may vary widely, however, it has been found that coating materials made up predominately of one or the other of five specific base compounds provide particularly good results, especially in combination with a substrate of titanium or a titanium base alloy. The five base compounds preferred for the coating materials are chromium oxide ($Cr_2O_3$), titanium dioxide ($TiO_2$), aluminum oxide ($Al_2O_3$), titanium carbide (TiC), and tungsten carbide (WC). Each of these compounds may be used either in substantially pure form or in combination with other additives intended to produce a more desirable coating or to facilitate the application of the coating to the substrate. Examples of mixtures which may be used are (80% $Cr_3C_2$+20% (NiCr), (TiC+5–20% Ni), (50% WC+ 35% NiCr+15% NiAl), and (WC+9% Co), where NiCr is made up of 80% Ni and 20% Cr and wherein the percentages given are volume percentages. Of all the combinations of materials which may be used when making the various parts of the bearing, the combination which is presently preferred consists of a first bearing member made of a body of compacted amorphous carbon and graphite impregnated with silver and a second member comprising a substrate made of a titanium base alloy including, in addition to the titanium, 5% by weight of aluminum and 2.5% by weight of tin (Ti-5Al-2.5Sn), and a ceramic coating of substantially pure chromium oxide. Substantially the same results are obtained by replacing this titanium base alloy with an alloy including, in addition to the titanium, 6% by weight of aluminum and 4% by weight of vanadium (Ti-6Al-4V).

A bearing embodying the present invention is shown in the drawing and, by way of example, is shown to be in the form of a spherical bearing incorporated in a rod end. The rod end is comprised of an externally threaded banjo 10 having a transverse bore which receives the bearing, indicated generally at 12. The two coengaging and relatively slideable members of the bearing consist of an inner ball member 14 and an outer member comprised of two separate annular bodies or rings 16, 16. The inner ball member 14 is a composite member and consists of a metallic substrate 18 and a ceramic coating 20. The substrate 18 is of a shape similar to that conventionally used for the ball member of a spherical bearing, it being annular in shape and having a spherical outer surface 22 which receives the ceramic coating 20. The coating 20, as mentioned, has a thickness of less than 0.010 of an inch and has an outer surface 23, conforming to the spherical surface 22 of the substrate, which is lapped or otherwise finished to a very high degree of smoothness. A bore 26 extends through the substrate 18 and at each end of the bore the substrate includes an end face 24 arranged perpendicular to the axis of the bore, the end faces 24, 24 therefore forming an annular corner at each end of the bore. In use, the threaded portion of the banjo 10 is threadably connected with one mechanism part and another mechanism part is connected to the inner bearing member 14 by a connecting member inserted through its bore. The end faces 24, 24 are free of the ceramic coating 20 and constitute surfaces against which washers or other retaining means may be tightly pressed for fixing such another part to the bearing during use thereof. It will therefore be noted that clamping forces which are applied between the end faces 24, 24 are resisted directly by the metallic substrate 18 and are not transmitted to any appreciable degree to the material of the ceramic coating 20. Damage to the ceramic material by the forces exerted on the inner member by the retaining means is therefore avoided.

The outer bearing member of the bearing 12, made up of the two annular bodies 16, 16, includes an internal spherical bearing surface 28 which engages the outer surface 23 of the ceramic coating on the inner member 14. The two rings or annular bodies 16, 16 are comprised at least in part of a carbonaceous material and, as mentioned, are preferably comprised of a blend of amorphous carbon and graphite compacted and impregnated with silver. These two rings 16, 16 are held in place by a retainer 30 having two radially inwardly directed flanges 32, 32 engaging opposite side surfaces of the rings and having two other flanges 34, 34 which are swaged radially outwardly against inclined annular seating surfaces on the banjo 10 to hold the retainer in the banjo. Through the coengaging spherical bearing surfaces 23 and 28, the inner member 14 is free to move in a universal member relative the ring members 16, 16. In this type of bearing, it is therefore impossible to exert high bending or shear loads on the ceramic member 14 as a result of misalignment and because of this the ceramic coating is particularly well suited to this type of bearing insofar as deformation of the coating due to high bending or shear loads is avoided.

The illustrated bearing is, however, designed to handle relatively high radial loads which, during movement of the inner member relative to the outer member, produce tensile stresses in various portion of the inner member 14. The fact that the inner member 14 is, however, comprised almost entirely of a high strength metal, and includes only a thin ceramic coating, allows the metal to react or absorb the tensile stresses without any high stresses being applied to the ceramic coating, the coating thereby being protected against damage by such stresses. Furthermore, the ceramic coating is of such a thickness as to be capable of deforming slightly with deformation of the substrate to allow transfer of stresses which would otherwise be built up in the coating, to the substrate, the coating being less than 0.010 of an inch thick, and preferably about 0.004 of an inch thick, and the material of the substrate having a hardness falling within the range of 30 Rc to 40 Rc.

The inner member 14 of an actual bearing such as shown in the drawing was made by the following process which is set hereforth in further explanation of the details of the bearing construction: A substrate or metal ball member was made by machining titanium alloy rod (Ti-5Al-2.5Sn) into a spherical shape having an approximate diameter of 0.005 to 0.010 inch under the final desired ball diameter and a surface finish of approximately 125 RMS. The bore and the two flat end faces were also machined at this time and the rod used was one previously annealed to a hardness falling within the range of 30Rc and 40Rc. Masks were then applied to the end faces and thereafter the surface of the ball was roughened by vapor blasting to provide better adherence for the coating. The spherical surface of the ball was then coated with a layer of chromium oxide ($Cr_2O_3$) to a thickness of 0.005 to .010 inch, the coating being applied by plasma spray gun equipment, After coating, the final spherical shape, surface finish and diameter were established by a lapping process, the resulting thickness of the finished coating being in the range of .0025 to .005 inch.

We claim:
1. A bearing comprising two coengaging members movable relative to one another, the first of said members being made at least in part of carbonaceous material and the second of said members being made from a substrate of metal selected from the group consisting of titanium and titanium base alloys and a ceramic coating on said substrate made predominantly of material selected from the group consisting of aluminum oxide, chromium oxide, titanium dioxide, tungsten carbide, and titanium carbide.

2. A bearing as defined in claim 1 further characterized by said ceramic coating being less than 0.010 of an inch thick, and said metal substrate having a hardness within the range of 30 Rc to 40 Rc.

3. A bearing as defined in claim 1 further characterized by said carbonaceous material being a blend of amorphous carbon and graphite.

4. A bearing as defined in claim 1 further characterized by said carbonaceous material being a blend of amorphous carbon and graphite impregnated with silver.

5. A bearing as defined in claim 4 further characterized by said ceramic coating being made of substantially pure chromium oxide and having a thickness of less than 0.010 of an inch, and said metal substrate having a hardness within the range of 30 Rc to 40 Rc.

6. A bearing as defined in claim 1 further characterized by said ceramic coating consisting predominantly of chromium oxide and having a thickness of less than 0.010 of an inch, and said metal substrate having a hardness within the range of 30 Rc to 40 Rc.

7. A bearing as defined in claim 1 further characterized by said ceramic coating consisting predominantly of aluminum oxide and having a thickness of less than 0.010 of an inch, and said metal substrate having a hardness within the range of 30 Rc to 40 Rc.

8. A bearing as defined in claim 1 further characterized by said ceramic coating consisting predominantly of titanium oxide and having a thickness of less than 0.010 of an inch, and said metal substrate having a hardness within the range of 30 Rc to 40 Rc.

9. A bearing as defined in claim 1 further characterized by said ceramic coating consisting predominantly of tungsten carbide and having a thickness of less than 0.010 of an inch, and said metal substrate having a hardness within the range of 30 Rc to 40 Rc.

10. A bearing as defined in claim 1 further characterized by said ceramic coating consisting predominantly of titanium carbide and having a thickness of less than 0.010 of an inch, and said metal substrate having a hardness within the range of 30 Rc to 40 Rc.

11. A bearing as defined in claim 1 further characterized by said substrate comprising an annular member having a bore extending therethrough and having a spherical outer surface coaxial with said bore, said ceramic coating covering said spherical outer surface, and said first member including a spherical surface engaging said ceramic coating to permit universal movement of said second member relative to said first member.

12. A bearing as defined in claim 11 further characterized by said anular substrate member including two flat faces located respectively at the opposite ends of said bore and in planes perpendicular to the axis of said bore, said two flat faces being free of said ceramic coating.

13. A bearing comprising two coengaging members movable relative to one another, the first of said members being made at least in part of carbonaceous material and the second of said members being made from a substrate of metal selected from the group consisting of titanium and titanium base alloys and a ceramic coating less than 0.010 of an inch thick on said substrate.

14. A bearing as defined in claim 13 further characterized by said substrate comprising an annular member having a bore extending therethrough and having a spherical outer surface coaxial with said bore, said ceramic coating covering said spherical outer surface, and said first member including a spherical surface engaging said ceramic coating to permit universal movement of said second member relative to said first member.

15. A bearing as defined in claim 14 further characterized by said anular substrate member including two flat faces located respectively at the opposite ends of said bore and in planes perpendicular to the axis of said bore, said two flat faces being free of said ceramic coating.

References Cited

UNITED STATES PATENTS

| | | |
|---|---|---|
| 2,058,143 | 10/1936 | Flanders. |
| 2,179,824 | 11/1939 | Kip. |
| 2,365,552 | 12/1944 | Hill _____ 287—90 X |
| 2,482,205 | 9/1949 | Potts _____ 308—238 |
| 2,541,790 | 2/1951 | Sugden. |
| 2,582,084 | 1/1952 | Terry _____ 308—4 |
| 2,613,119 | 10/1952 | Seemann _____ 308—237 X |
| 2,696,413 | 12/1964 | Wheildon. |
| 2,733,968 | 2/1956 | Pelz _____ 308—238 |
| 2,752,210 | 6/1956 | Clark. |
| 2,760,925 | 8/1956 | Bryant _____ 308—241 X |
| 2,934,480 | 4/1960 | Slomin _____ 308—241 X |
| 3,037,828 | 6/1962 | Michael. |
| 3,273,944 | 9/1966 | Hammon _____ 308—241 |
| 3,284,144 | 11/1966 | Moore _____ 308—3 |
| 3,285,680 | 11/1966 | Dailey _____ 308—241 |

FOREIGN PATENTS

| | | |
|---|---|---|
| 187,756 | 11/1956 | Austria. |
| 1,023,007 | 3/1966 | Great Britain. |

MANUEL A. ANTONAKAS, Primary Examiner

U.S. Cl. X.R.

308—238, 241